(12) United States Patent
Casaccia et al.

(10) Patent No.: US 7,142,565 B2
(45) Date of Patent: Nov. 28, 2006

(54) METHOD AND APPARATUS FOR RADIO LINK CONTROL OF SIGNALING MESSAGES AND SHORT MESSAGES DATA SERVICES IN A COMMUNICATION SYSTEM

(75) Inventors: Lorenzo Casaccia, San Diego, CA (US); Lijun Zhao, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 866 days.

(21) Appl. No.: 10/079,790

(22) Filed: Feb. 21, 2002

(65) Prior Publication Data

US 2003/0156599 A1 Aug. 21, 2003

(51) Int. Cl.
*H04J 3/06* (2006.01)
*H04L 12/56* (2006.01)

(52) U.S. Cl. ............... 370/474; 370/394; 370/469; 370/476

(58) Field of Classification Search ............... None
See application file for complete search history.

(56) References Cited

U.S. PATENT DOCUMENTS

| 5,333,135 | A | * | 7/1994 | Wendorf | 370/394 |
| 5,612,742 | A | * | 3/1997 | Krause et al. | 375/240.25 |
| 6,160,808 | A | * | 12/2000 | Maurya | 370/389 |
| 6,778,558 | B1 | * | 8/2004 | Balachandran et al. | 370/470 |
| 6,961,326 | B1 | * | 11/2005 | Chang et al. | 370/338 |

* cited by examiner

*Primary Examiner*—Chi Pham
*Assistant Examiner*—Justin M Philpott
(74) *Attorney, Agent, or Firm*—Philip Wadsworth; Thien Nguyen; S. Hossain Beladi (57) ABSTRACT

A system and various methods and apparatus for efficient communications of data across various protocol layers are disclosed. A control system (210, 401) segments each message of a plurality of messages into a plurality of segments. A segment identification (805) is incorporated in each segment (804) identifying each segment as one of a start segment, a middle segment and an end segment of each message. Moreover, a sequence number (806) is incorporated in each segment of the plurality of messages in a stream of messages (801). The stream of messages (801) may include control messages (802) and short message service messages (803). The plurality of segments is transmitted by a transmitter (300) in an order of the sequence number (806) from a source to a destination.

16 Claims, 9 Drawing Sheets

METHOD AND APPARATUS FOR RADIO LINK CONTROL OF SIGNALING MESSAGES AND SHORT MESSAGES DATA SERVICES IN A COMMUNICATION SYSTEM

FIELD

The present invention relates generally to the field of communications.

BACKGROUND

In a communication system, unnecessary and excessive transmission by a user may cause interference for other users in addition to reducing the system capacity. The unnecessary and excessive transmission may be caused by inefficient flow of data in the communication system. The data communicated between two end users may pass through several layers of protocols for assuring proper flow of data through the system. The proper delivery of data in at least one aspect is assured through a system of checking for error in each packet of data, and requesting a retransmission of the same packet of data if an unacceptable error is detected in the packet of data. Passing data from one protocol layer to another may be performed for a group of data packets at a time. The group of data packets may include several messages. The missing packet(s) may belong to one of the messages. Therefore, some messages in the group of data packets may have arrived completely. As a result, the retransmission process for missing packets may delay passing the completed messages.

To this end as well as others, there is a need for a method and apparatus to efficiently control the flow of data in a communication system.

SUMMARY

A system and various methods and apparatus for efficient communications of data across various protocol layers are disclosed. A control system segments each message of a plurality of messages into a plurality of segments. A segment identification is incorporated in each segment identifying each segment as one of a start segment, a middle segment and an end segment of each message. Moreover, a sequence number is incorporated in each segment of the plurality of messages in a stream of messages. The stream of messages may include control messages and short message service messages. The plurality of segments is transmitted by a transmitter in an order of the sequence number from a source to a destination. At the destination, a control system may detect an out of order reception of the transmitted plurality of segments. The control system identifies and requests retransmission of at least one of the missing segments. The control system reconstructs each message of the plurality of messages based on the incorporated segment identification and the sequence number that does not include the missing segments. The control system passes each of the reconstructed messages to an upper protocol layer without waiting for reception of missing segments for other messages in the stream of messages. At the destination, a receiver receives retransmission of the missing segments. The control system reconstructs the other messages and passes the reconstructed other messages to the upper protocol layer. The stream of messages is received through a signaling protocol layer in the communication system. The control system multiplexes the plurality of segments with streams of data packets generated by a radio link protocol layer for transmitting in accordance with a physical protocol layer from the source to the destination.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3qpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, a novel and improved method and apparatus provide for efficient use of communication resources in a CDMA communication system by efficiently determining proper flow of data from one communication protocol layer to another. The flow of data is controlled by segmenting the messages. The segmentation process identifies the start, middle and end segments of a message within a stream of messages. A message received completely at a destination is passed on to a higher protocol layer without waiting for the missing segments in a different message transmitted in the stream of messages. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
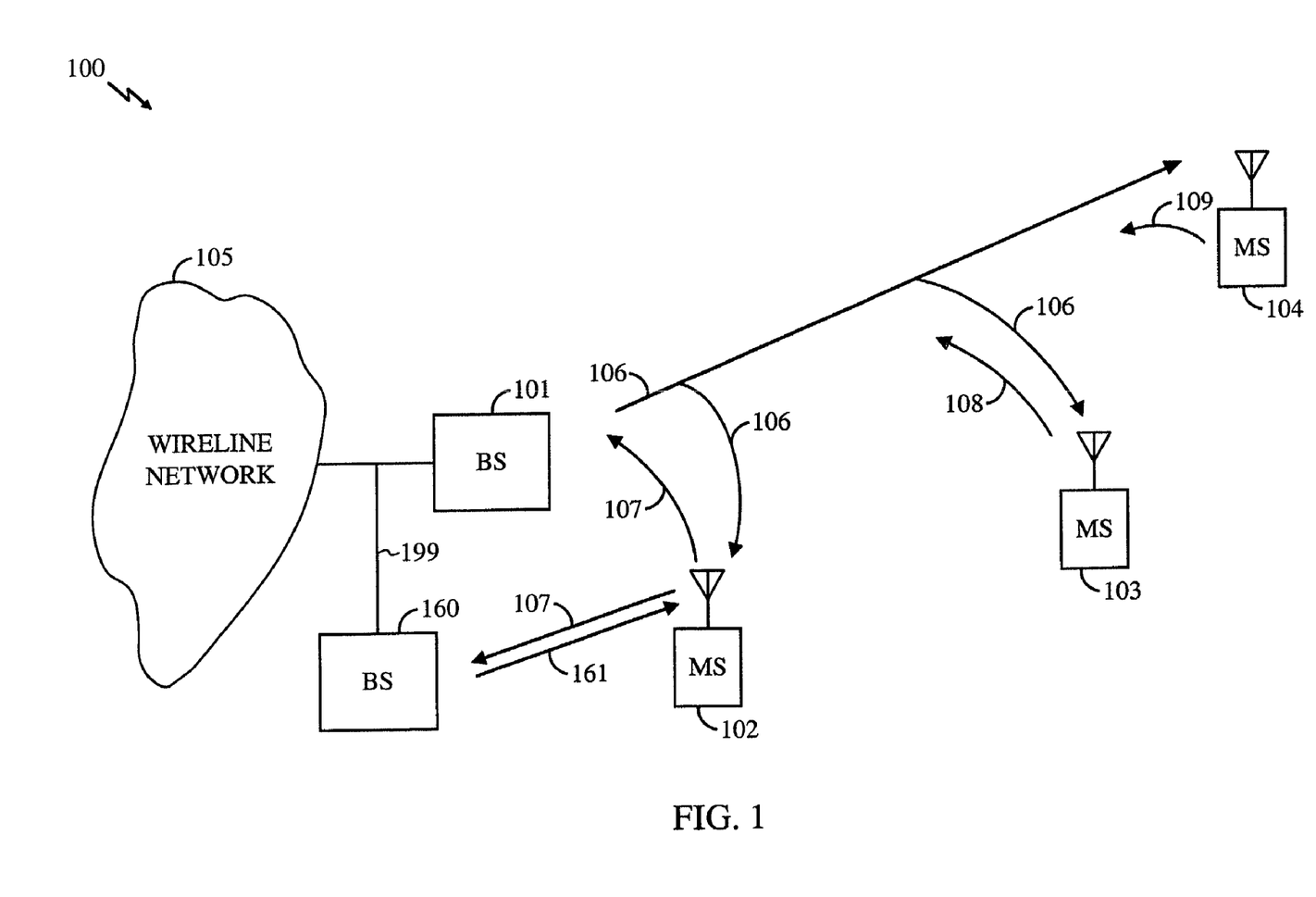
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. The mobile stations in FIG. 1 may be referred to as data access terminals (AT) and the base station as data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102–104 may be summed to form a forward link signal 106. Each of the mobile stations 102–104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102–104 communicate with base stations 101 and 160 via corresponding reverse links. Each reverse link is maintained by a reverse link signal, such as reverse link signals 107–109 for respectively mobile stations 102–104. The reverse link signals 107–109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102.

The communications between the base stations and the mobile stations in communication system 100 may include communications of data and voice. Such a communication link also includes communications of control messages for establishing, maintaining and terminating the flow of data between the base stations and the mobile stations. The control information may be in a form of a stream of messages that are communicated between the source and destination. The control information, therefore, may be processed through a signaling protocol layer. Such control messages are transmitted, received and processed at a priority level that allows proper flow of user data between the end users. The signaling protocol layer may also be used for communications of short message service messages. Such messages are also transmitted, received and processed at a high priority level. Various aspects of the invention allow for proper flow control of signaling messages and short message service messages.

Figure 2:
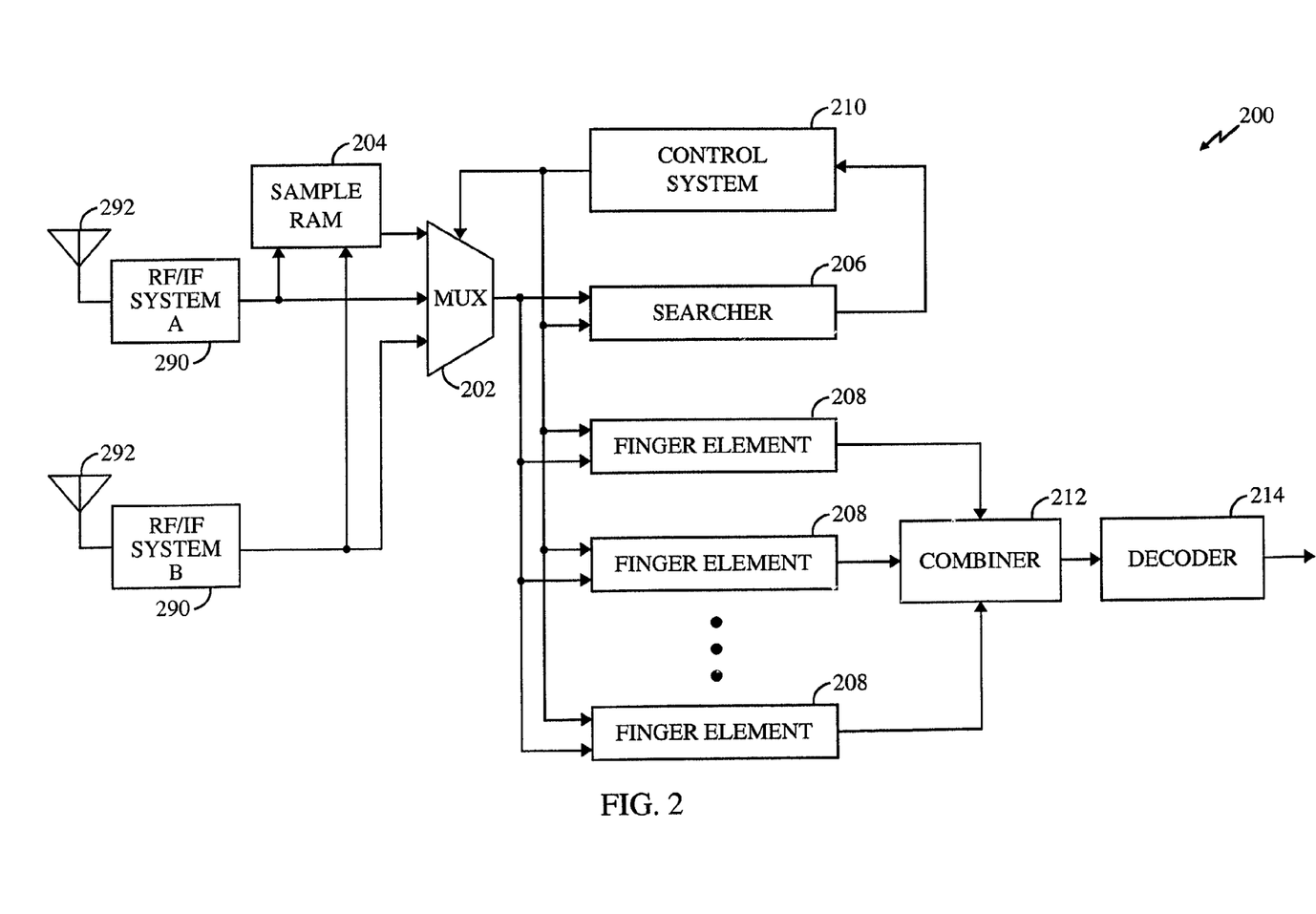
FIG. 2 illustrates a communication system receiver for receiving and decoding received packets of data at a data rate in accordance with various aspects of the invention.

FIG. 2 illustrates a block diagram of a receiver 200 used for processing and demodulating the received CDMA signal. The CDMA signal may carry the signaling messages and short message service messages. Receiver 200 may be used for decoding the information on the reverse and forward links signals. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, downconverted and digitized to form RX samples at base band frequencies. The samples are supplied to a demultiplexer (demux) 202. The output of demux 202 is supplied to a searcher unit 206 and finger elements 208. A control unit 210 is coupled thereto. A combiner 212 couples a decoder 214 to finger elements 208. Control unit 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to demux 202. Demux 202 supplies the samples to searcher unit 206 and finger elements 208. Control unit 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

Figure 3:
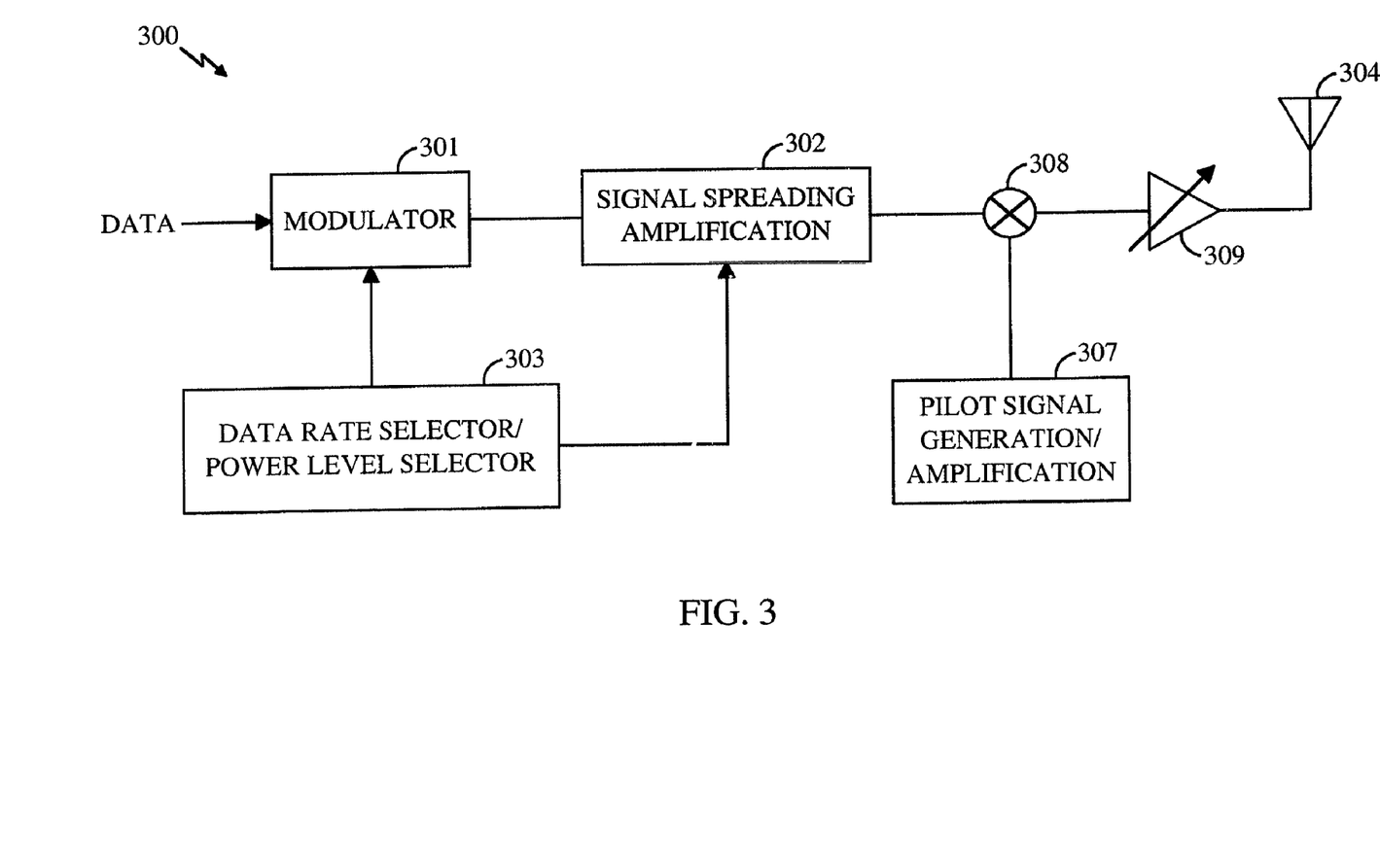
FIG. 3 illustrates a communication system transmitter for transmitting data packets at a scheduled data rate in accordance with various aspects of the invention.

FIG. 3 illustrates a block diagram of a transmitter 300 for transmitting the reverse and forward link signals. The signals may carry the signaling messages and short message service messages. The channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal in accordance with the feedback information. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal is combined with the channel signal in a combiner 308. The combined signal may be amplified in an amplifier 309 and transmitted from antenna 304. The antenna 304 may be in any number of combinations including antenna arrays and multiple input multiple output configurations.

Figure 4:
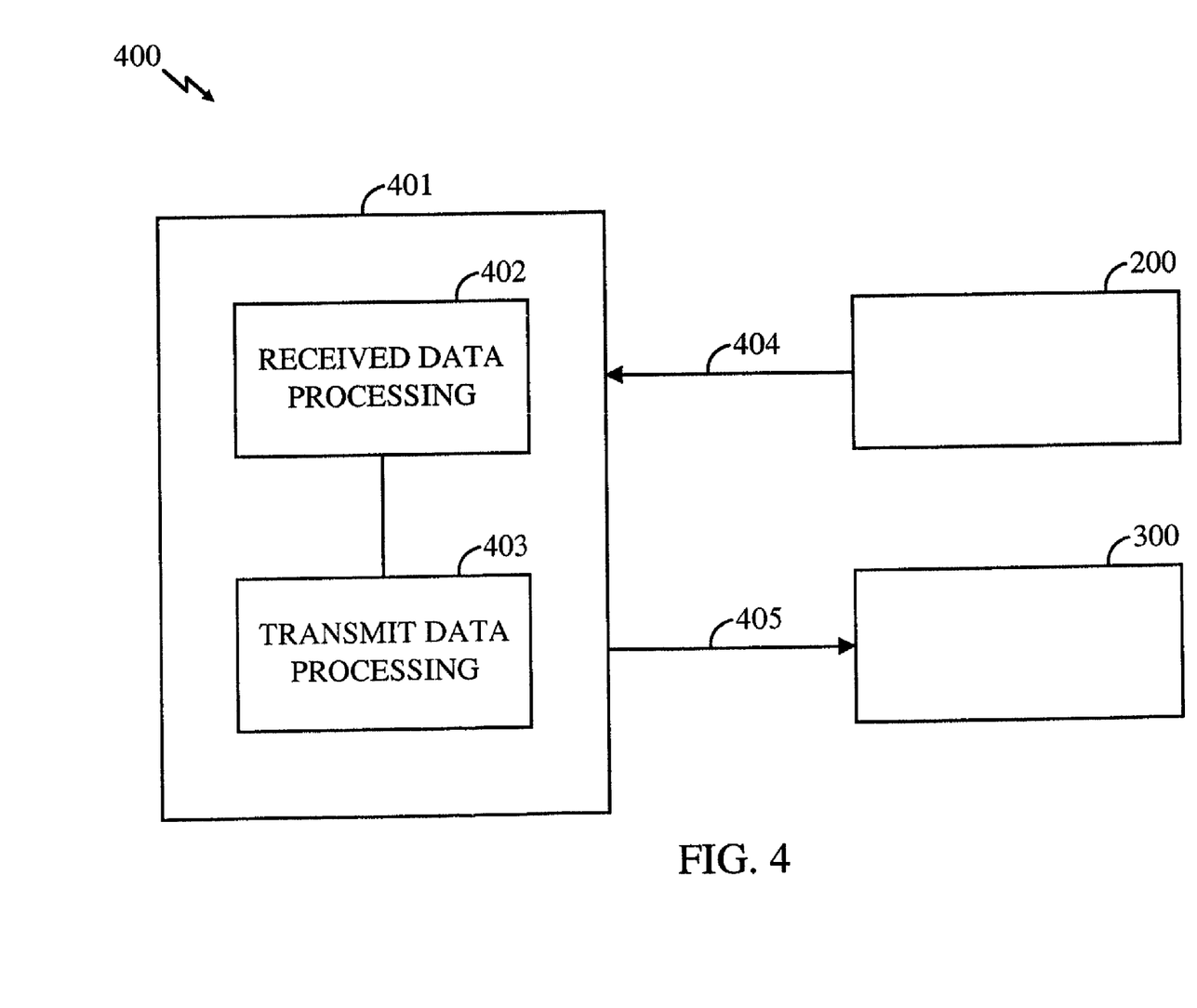
FIG. 4 illustrates a transceiver system capable of operating in accordance with various embodiments of the invention.

FIG. 4 depicts a general diagram of a transceiver system 400 for incorporating receiver 200 and transmitter 300 for maintaining a communication link with a destination. The transceiver 400 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting. Transmitter 300 receives the data for transmission on input 405. Transmit data processing block 403 prepares the data for transmission on a transmit channel. Received data, after being decoded in decoder 214, are received at processor 400 at an input 404. Received data are processed in received data processing block 402 in processor 401. The processing of the received data generally includes checking for error in the received packets of data. For example, if a received packet of data has error at an unacceptable level, the received data processing block 402 sends an instruction to transmit data processing block 403 for making a request for retransmission of the packet of data. The request is transmitted on a transmit channel. Various operations of processor 401 may be integrated in a single or multiple processing units. The transceiver 400 may be connected to another device. The transceiver 400 may be an integral part of the device. The device may be a computer or operates similar to a computer. The device may be connected to a data network, such as Internet. In case of incorporating the transceiver 400 in a base station, the base station through several connections may be connected to a network, such as Internet.

Figure 5:
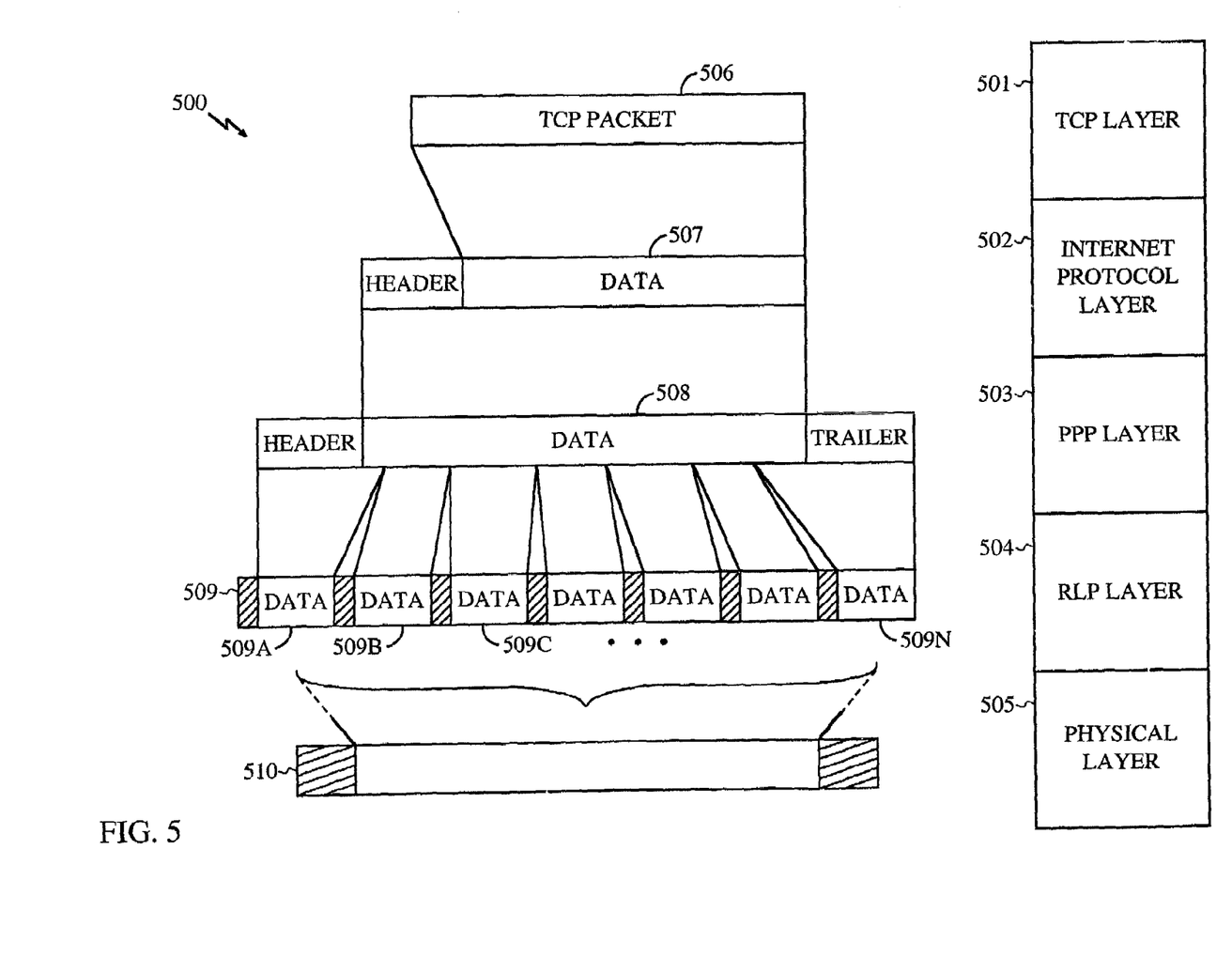
FIG. 5 illustrates a stack of protocol layers for controlling flow of data in a communication system.

The flow of data between two end points may be controlled via several protocol layers. An exemplary stack of the protocol layers 500 is shown in FIG. 5 for controlling flow of data between two end points. For example, one end point may be a source connected to Internet through the network 105. The other end point may be a data processing unit such as a computer coupled to a mobile station or integrated in a mobile station. The protocol layers 500 may have several other layers or each layer may have several sub-layers or other layers may operate in parallel. A detailed stack of protocol layers is not shown for simplicity. The stack of protocol layers 500 may be followed for flow of data in a data connection from one end point to another. At the top layer, a TCP layer 501 controls the TCP packets 506. TCP packets 506 may be generated from a much larger data file. The data file may be partitioned into several TCP packets 506. The data file may include text message data, video data, picture data or voice data. The size of the TCP packets 506 may be different at different times. At the Internet Protocol layer (IP) layer 502, a header is added to the TCP packets 506 to produce data packet 507. The header may identify a port number for proper routing of the packets of data to the appropriate application. At a point-to-point protocol (PPP) layer 503, PPP header and trailer data are added to data packet 507 to produce data packet 508. The PPP data may identify the point-to-point connection addresses for proper routing of a packet of data from a source connection point to a destination connection point. A radio link protocol (RLP) layer 504 provides a mechanism for retransmission and duplication of data packets. At RLP layer 504, the data packet 508 is divided into several RLP packets 509A–N. Each of the RLP packets 509A–N is processed independently and assigned a sequence number. The sequence number is added to the data in each RLP packet of data for identifying the RLP packet of data among the RLP packets 509A–N. One or more of the RLP packets 509A–N is placed into a physical layer packet of data 510. The size of the payload of the packet of data 510 may vary from time to time. A physical layer 505 controls the channel structure, frequency, power output, and modulation specification for data packet 510. The data packet 510 is transmitted to a destination. The size of data packet 510 may be different from time to time based on the channel condition and the selected communication data rate. The size of data packet 510 may also be based on a transmission option selected by a user.

On a receiving destination, the data packet 510 is received and processed. The received packet 510 may be passed on to RLP layer 504. The received packet 510 may be discarded by the physical layer when the received packet has errors. The RLP layer 504 attempts to reconstruct the RLP packets 509A–N from the correctly received packets of data. In order to reduce the packet error rate seen by the higher layer of protocol, such as PPP layer 503 and IP layer 502, the RLP layer 504 incorporates an automatic retransmission request (ARQ) mechanism by requesting re-transmission of the missing RLP packets. The RLP protocol re-assembles packets 509A–N to form a complete packet 508. The process may take some time to completely receive all the RLP packets 509A–N. Several transmissions of data packet 510 may be needed to completely send all the RLP packets 509A–N. When an RLP packet of data is received out of sequence, the RLP layer 504 sends a negative acknowledgement (NAK)

message to the transmitting destination. In response, the transmitting destination retransmits the missing RLP data packet.

Figure 6:
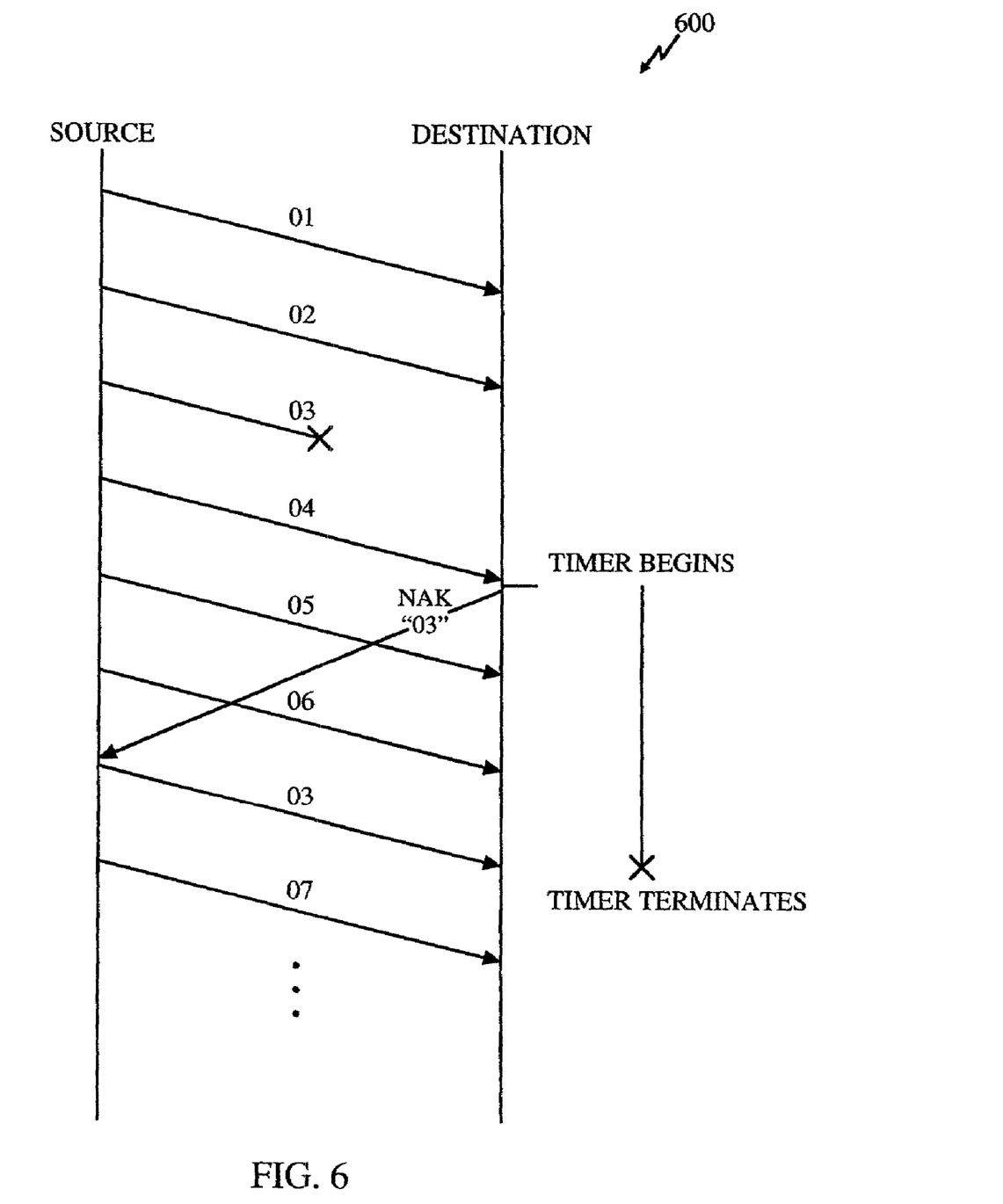
FIG. 6 illustrates a process for retransmission of a missing packet of data.

Referring to FIG. 6, a message flow 600 is shown to provide an exemplary flow of data at the physical layer 505. The RLP packets with sequence numbers "01" to "07" are sent from a source to a destination, for example. The source and destination may be, respectively, either a base station and a mobile station or a mobile station and a base station. At the RLP layer 504, the RLP packets 509A–N are accumulated to complete the packet 508. Once all the RLP packets are received, the RLP packets 509A–N are passed on to a higher level. One or more RLP packets may be combined into a common payload and sent on one data packet 510. In the exemplary message flow 600, the RLP packet identified as RLP packet "03", for example, does not get to the destination. The failure may be due to many factors including disruption of the radio link between the source and the destination. After the destination receives RLP packet "04", the RLP layer 504 detects an out of sequence reception of the RLP packets. The RLP layer 504 sends a NAK message identifying RLP packet "03" as missing in the communication. At the same time RLP layer 504 begins a timer. The timer counts the lapsed amount of time after sending the NAK message. If the timer expires, for example after 500 mSec, before receiving the missing RLP packet "03", the destination RLP 504 may assume that the retransmission of the missing packet has failed and the destination RLP may deliver to the upper layer the RLP packets that have been received in sequence up to the next missing RLP packet. If there is no other missing RLP packet, the RLP may deliver all the received in-sequence packets. The source may limit the number of retransmission of an RLP packet only to one time. Therefore, in such a situation, sending another NAK message may not help because the source may have retransmitted the missing RLP packet "03" without being received at the destination. Once the missing RLP packet "03" is received, the timer terminates and the packets that have been correctly received can be delivered to the upper layer.

The TCP layer 501 also has a similar retransmission process. If the TCP layer 501 at the receiving destination does not receive an expected TCP 506 for some time, the TCP layer 501 at the transmitting source re-transmits the TCP packet. The process of sending a NAK message and waiting to receive the missing RLP data packet at the RLP layer 504 may take some time. During this time, RLP layer 504 holds off delivery of data to the upper layer. Delivery, to a higher layer, of a correctly received RLP packet that may have a sequence number higher than the sequence number of the missing RLP packet is prevented in spite of its correct reception. Since the RLP layer 504 waits for example at least 500 mSec to receive a missing RLP packet, passing the RLP packets that have been received correctly may get delayed for a substantial amount of time. The RLP layer 504 normally does not send up an incomplete set of RLP packets 509A–N to a higher level.

Figure 7:
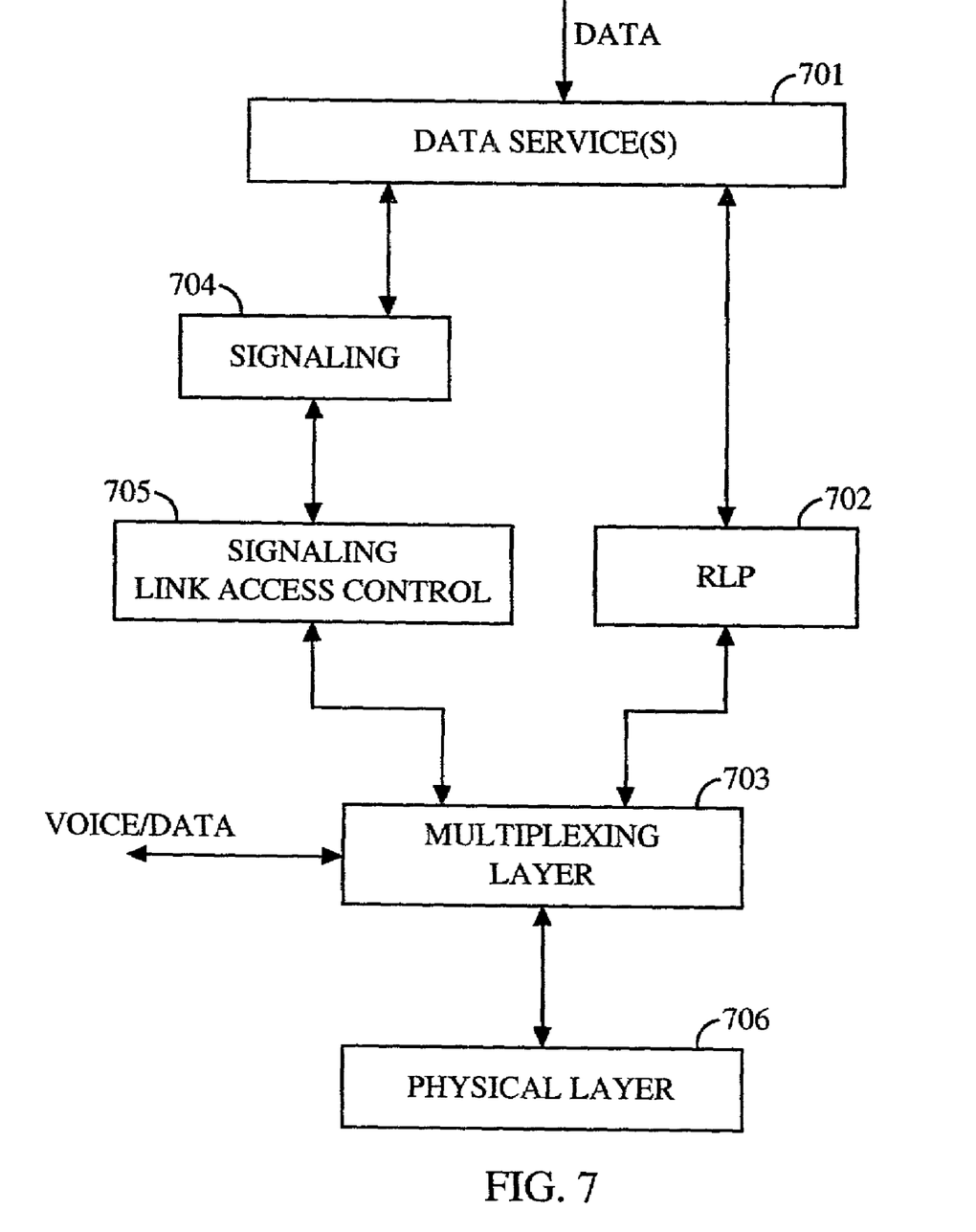
FIG. 7 illustrates various flow of control messages and short message service messages.

Referring to FIG. 7, a more detailed diagram of the interfaces for the lower protocol layers for voice and data service is shown. At a data service interface 701, the data for transmission are received. The data is passed to an RLP interface 702. The data are also passed on to a signaling interface 704. The signaling interface 704 provides the signaling information to a signaling link access control (LAC) 705. The RLP data from RLP interface 702, the signaling information and voice/data information are passed to a multiplexing layer interface 703. The received data are formed and adapted for use by the physical layer interface 706. The data is transmitted to a destination. Various interfaces for processing data operate in reverse for passing the received data from the physical layer interface 706 to a higher protocol layer. For example, the multiplexing layer interface 703 passes the received data from the physical layer 706 to an appropriate interface such as RLP interface 702 and signaling LAC interface 705. The data passing through RLP interface 702 and signaling LAC interface 705 may have independent ARQ scheme for keeping track of the received and transmitted data packets.

Figure 8:
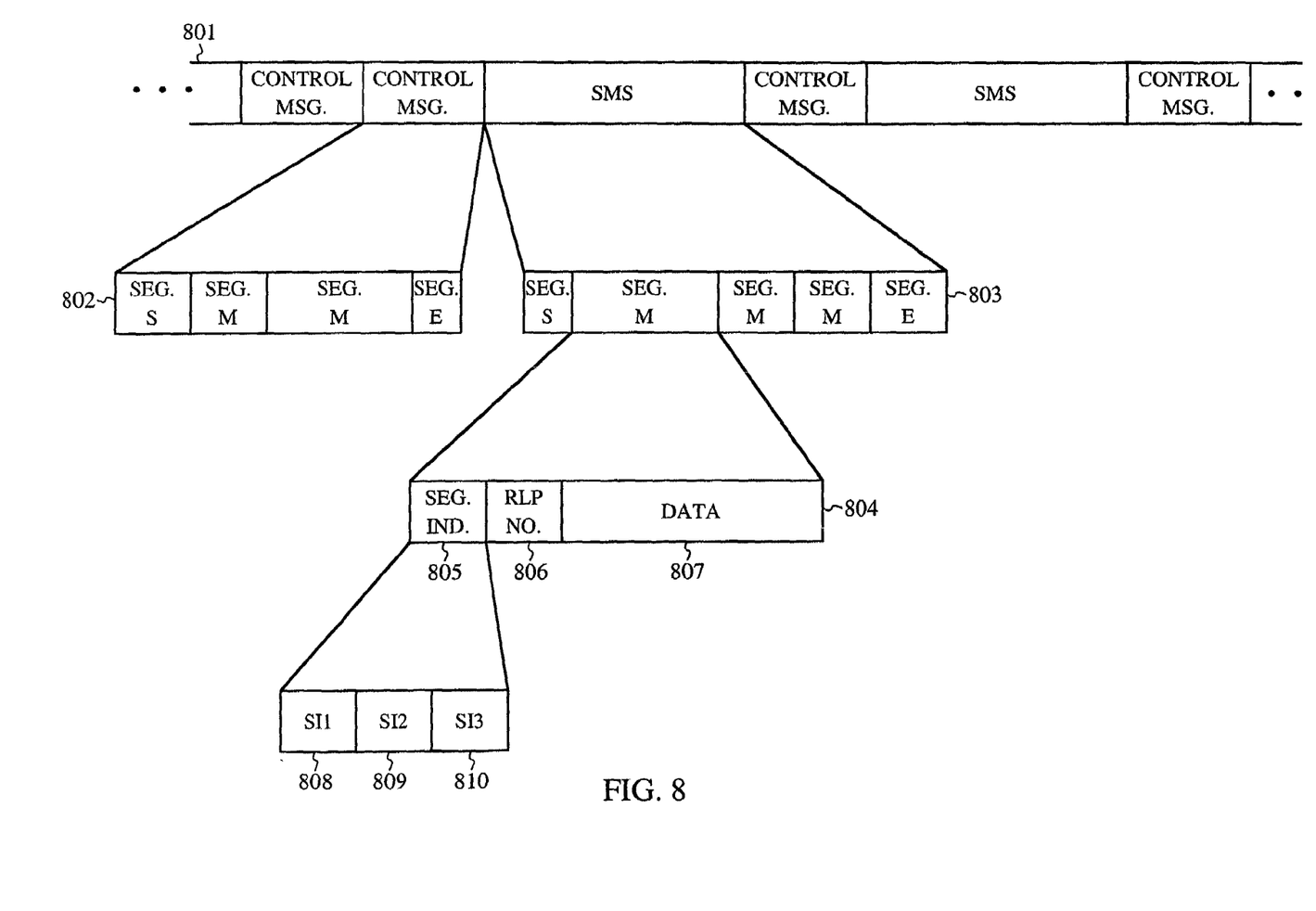
FIG. 8 illustrates segmentation of messages in accordance with various aspects of the invention.

The signaling data are formed into independent messages for controlling flow of data. The data services may also include short message services (SMS). The SMS is provided to a user for receiving or transmitting a short message. Normally, for getting the SMS messages to a destination, the SMS message may be processed by the signaling interface 704 and/or signaling LAC 705. Therefore, the signaling messages include SMS messages and control messages. Referring to FIG. 8, an example of a stream of data messages 801 passing through the signaling interface is shown. The stream of messages 801 includes control messages and SMS messages. In accordance with various aspects of the invention, each message in the stream of messages 801 is segmented into one or more segments. For example, control message 802 is segmented into four segments. The first segment is the start segment, the last segment is the end segment and other segments in the middle are the middle segments. In another example, the SMS message 803 is segmented into five segments. The first segment is the start segment, the last segment is the end segment and other segments in the middle are the middle segments. Each segment may be at different size. The process of segmenting a message is repeated for all messages passing through signaling interfaces 704 and 705. In addition, an RLP sequence number is also added to each segment. As a result, each segment has an RLP sequence number and a segmentation identification. The segmentation identification identifies whether the segment is a start segment, an end segment or a middle segment. There is only one start segment and one end segment in each message. Each message may have a number of middle segments. An exemplary data segment 804 is shown. The data segment 804 includes a segment identifier field 805, an RLP sequence number field 806 and a data field 807. The segment identifier field may include three data bits. The first segment identifier (SI) bit 808 may identify whether message segmentation is used. The second SI bit 809 may identify whether the segment is the first segment of the message. The third SI bit 810 may identify whether the segment is the end segment of the message. All other segments are the middle segments by default.

Figure 9:
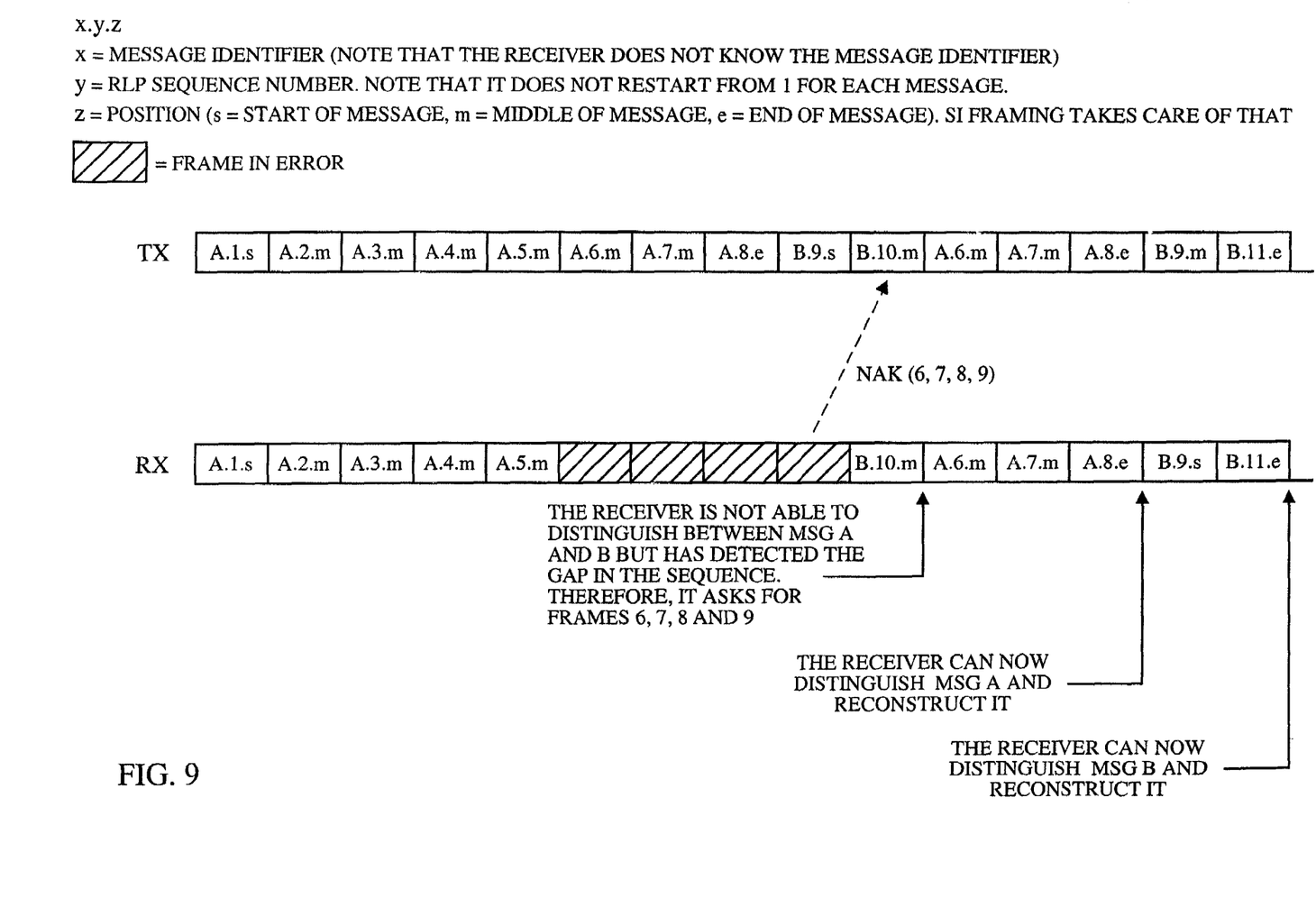
FIG. 9 illustrates automatic request for retransmission of missing segments and passing completed messages to an upper protocol layer in accordance with various aspects of the invention.

Referring to FIG. 9, an exemplary flow of segmented messages between a receiver and a transmitter is shown. A transmitter may transmit messages "A" and "B". The messages may pass through the signaling interfaces and formatted accordingly. One message may be a control message and another a SMS message. The message "A" is segmented into eight segments. The start segment has RLP sequence number "1" and the end segment has the RLP sequence number 8. The message "B" is segmented into three segments. The start segment has RLP sequence number "9" and the end segment has the RLP sequence number 11. The segments with RLP sequence numbers 1–5 are correctly received at the destination. The following segment that is correctly received is the segment with RLP sequence number 10. Upon its reception, the receiver may detect an out of sequence reception of packets of data. The receiver requests the retransmission of segments 6, 7, 8 and 9 with an appropriate message that is understood by the source. Upon reception of the request for retransmission, the source may decide to retransmit immediately the requested segments. On the retransmission, as soon as the segment with RLP sequence number 8 is received, the receiver detects a complete reception of all segments associated with the message "A". The receiver at this point may reconstruct the message "A" and pass the message to a higher level protocol without waiting to receive the retransmission of the segment with RLP sequence number "9". After receiving the segment "9", the receiver may detect the segment is a start of a message "B". Once the segment "11" is received, being identified as the end of message "B", the receiver may then reconstruct the message "B" and pass it to a higher level protocol.

Various components of the communication system 100 may control various aspects of the stack of protocol layers 500. For example, a computer server or a collection of computers, not shown, connected to network 105 may control TCP layer 501, IP layer 502 and PPP layer 503. Various aspects of the invention may be controlled by processor 401 through operations of the received and transmit data processing units 402 and 403, and/or control system 210. In accordance with various aspects of the invention, processor 401 may control the segmentation of the messages and the retransmission process. The physical layer communications may be performed at various data rates. The selected data rate depends on the channel condition. At high data rate, a large number of RLP packets may be communicated between a mobile station and a base station in a short period of time. A successful retransmission process also takes a short time to complete, depending on the channel condition, when the messages are segmented and processed accordingly. In accordance with various aspects of the invention, the retransmission process for a message may be concluded when the start, end and middle segments of the message are received. Therefore, in accordance with various aspects of the invention, for a stream of messages, the retransmission process is controlled in a manner that allows processing retransmission of segments of a message while concluding the retransmission process for another message.

The processor 401 through operations of received data processing block 402 and transmit data processing block 403 may perform various steps of the invention. The received data processing block 402 may detect receiving an out of sequence RLP packet of data. The missing RLP packet of data may be the RLP packet "03" as shown in the example in FIG. 6. The processor 401 determines whether a retransmission of the missing RLP packet is received and whether all segments of a message have been received. If all the segments have been received, the message is reconstructed and passed up to a higher level protocol. As such, the retransmission process is controlled in an efficient manner for controlling flow of data from one protocol layer to another. Processing data is made more efficient in respect to the ARQ process and flow of messages, in a stream of messages, to the higher-level protocol layers. The messages in the stream of messages may include SMS messages and signaling messages.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for communications of data in a communication system comprising:

segmenting each message of a plurality of messages, in a stream of messages, into a plurality of segments;

incorporating a segment identification in each segment identifying each segment as one of a start segment, a middle segment and an end segment of each message;

incorporating a sequence number in each segment of said plurality of messages;

transmitting said plurality of segments in an order of said sequence number from a source to a destination;

detecting an out of order reception of said transmitted said plurality of segments at said destination, thereby indicating at least a missing segment;

identifying and requesting retransmission of at least one of the missing segments;

reconstructing each message of said plurality of messages, based on said incorporated segment identification and said sequence number, that exclude said least one of missing segments; and passing each of said reconstructed messages to an upper protocol layer without waiting for reception of the missing segments of said excluded messages.

2. The method as recited in claim 1 further comprising:
receiving retransmission of said least one of missing segments;
reconstructing said excluded messages; and
passing said reconstructed excluded messages to said upper protocol layer.

3. The method as recited in claim 1 further comprising:
receiving said stream of messages through a signaling protocol layer, wherein said plurality of messages includes control messages and short message service messages.

4. The method as recited in claim 1 further comprising:
multiplexing said plurality of segments with streams of data packets generated by a radio link protocol layer for said transmitting from a physical protocol layer.

5. An apparatus for communications of data in a communication system comprising:
a control system for segmenting each message of a plurality of messages into a plurality of segments, incorporating a segment identification in each segment identifying each segment as one of a start segment, a middle segment and an end segment of each message and incorporating a sequence number in each segment of said plurality of messages in a stream of messages, detecting an out of order reception of said transmitted said plurality of segments at said destination, identifying and requesting retransmission of at least one of missing segments, reconstructing each message of said plurality of messages, based on said incorporated segment identification and said sequence number, that excludes said least one of missing segments, and passing each of said reconstructed messages to an upper protocol layer without waiting for reception of missing segments for said excluded messages; and
a transmitter for transmitting said plurality of segments in an order of said sequence number from a source to a destination.

6. The apparatus as recited in claim 5 further comprising:
a receiver for receiving retransmission of said least one of missing segments, wherein said control system is further for reconstructing said excluded messages and passing said reconstructed excluded messages to said upper protocol layer.

7. The apparatus as recited in claim 5 wherein said control system is further for receiving said stream of messages through a signaling protocol layer, wherein said plurality of messages include control messages and short message service messages.

8. The apparatus as recited in claim 5 wherein said control system is further for multiplexing said plurality of segments with streams of data packets generated by a radio link protocol layer for said transmitting from a physical protocol layer.

9. A communication system comprising:
a control system in a source station for segmenting each message of a plurality of messages into a plurality of segments, incorporating a segment identification in each segment identifying each segment as one of a start segment, a middle segment and an end segment of each message and incorporating a sequence number in each segment of said plurality of messages in a stream of messages, detecting an out of order reception of said transmitted said plurality of segments at said destination station, identifying and requesting retransmission of at least one of missing segments, reconstructing each message of said plurality of messages, based on said incorporated segment identification and said sequence number, that excludes said least one of missing segments, and passing each of said reconstructed messages to an upper protocol layer in connection with said destination station without waiting for reception of missing segments for said excluded messages; and
a transmitter in said source station for transmitting said plurality of segments in an order of said sequence number from said source station to a destination station.

10. The system as recited in claim 9 further comprising:
a receiver at said destination station for receiving retransmission of said least one of missing segments, wherein said control system is further for reconstructing said excluded messages and passing said reconstructed excluded messages to said upper protocol layer.

11. The system as recited in claim 9 wherein said control system is further for receiving said stream of messages through a signaling protocol layer, wherein said plurality of messages include control messages and short message service messages.

12. The system as recited in claim 9 wherein said control system is further for multiplexing said plurality of segments with streams of data packets generated by a radio link protocol layer for said transmitting from a physical protocol layer.

13. A microprocessor based system configured for use in a communication system for communications of data comprising:
means for segmenting each message of a plurality of messages, in a stream of messages, into a plurality of segments;
means for incorporating a segment identification in each segment identifying each segment as one of a start segment, a middle segment and an end segment of each message;
means for incorporating a sequence number in each segment of said plurality of messages;
means for transmitting said plurality of segments in an order of said sequence number from a source to a destination;
means for detecting an out of order reception of said transmitted said plurality of segments at said destination, thereby indicating at least a missing segment;
means for identifying and requesting retransmission of at least one of the missing segments;
means for reconstructing each message of said plurality of messages, based on said incorporated segment identification and said sequence number, that exclude said least one of missing segments; and
means for passing each of said reconstructed messages to an upper protocol layer without waiting for reception of the missing segments of said excluded messages.

14. The microprocessor as recited in claim 13 further comprising:
means for receiving retransmission of said least one of missing segments;
means for reconstructing said excluded messages; and
passing said reconstructed excluded messages to said upper protocol layer.

15. The microprocessor as recited in claim 13 further comprising:
  means for receiving said stream of messages through a signaling protocol layer, wherein said plurality of messages includes control messages and short message service messages.

16. The microprocessor as recited in claim 13 further comprising:
  means for multiplexing said plurality of segments wit streams of data packets generated by a radio link protocol layer for said transmitting from a physical protocol layer.

* * * * *